United States Patent [19]

Lovell

[11] 4,275,111

[45] Jun. 23, 1981

[54] CORROSION PROTECTION STRUCTURE

[76] Inventor: Roger Lovell, P.O. Box 981, Palacios, Tex. 77465

[21] Appl. No.: 587

[22] Filed: Jan. 2, 1979

Related U.S. Application Data

[63] Continuation-in-part of Ser. No. 783,467, Mar. 31, 1977, abandoned.

[51] Int. Cl.[2] .......... B32B 3/26

[52] U.S. Cl. .......... 428/306; 428/321

[58] Field of Search .......... 427/247, 409, 417, 292, 427/418; 428/306, 321, 467, 613

[56] References Cited

U.S. PATENT DOCUMENTS

| | | | |
|---|---|---|---|
| 187,559 | 2/1877 | Richardson | 427/292 |
| 663,281 | 12/1900 | Kopp | 427/418 |
| 1,159,748 | 11/1915 | Comstock | 427/418 |
| 1,638,342 | 8/1927 | Kessler | 427/417 X |
| 1,834,746 | 12/1931 | Short | 428/613 |
| 2,288,633 | 7/1942 | Luckhaupt | 428/321 |
| 2,796,363 | 6/1957 | Lalone | 427/421 X |

*Primary Examiner*—Evan K. Lawrence
*Attorney, Agent, or Firm*—Albert L. Gabriel

[57] ABSTRACT

A corrosion protection structure for a metal body having pores which communicate with the outer surface of the body is designed to protect against corrosive agents of the atmosphere and marine environments. The structure comprises an inner protective material substantially impervious to atmospheric corrosive agents disposed within the pores, the outer surface of the body being free of the material, and a solid outer protective material, different from the inner material and substantially impervious to atmospheric corrosive agents and to the inner material, covering the outer surface and the pores and intimately bonded to the outer surface. To form the corrosion protection structure, the pores of the body are impregnated with the inner protective material, preferably oil. After the impregnation, any of the inner protective material such as oil that may remain on the outer surface of the metal is selectively removed while the inner protective material in the pores is selectively retained. Thereafter, the outer protective covering material, preferably a resin, is applied over the outer surface and pores and intimately bonded to the metal surface to protect the metal from corrosion initiating from the outside. The inner protective material remains operatively disposed in the pores to protect the covering from corrosive undermining.

21 Claims, 5 Drawing Figures

CORROSION PROTECTION STRUCTURE

RELATED APPLICATION

This is a continuation-in-part of my co-pending application Ser. No. 783,467, filed Mar. 31, 1977, abandoned, for CORROSION PREVENTION METHOD.

BACKGROUND OF THE INVENTION

1. Field of the Invention

The present invention is in the field of protective coatings for structures made of corrodible metal, and the invention relates more particularly to improving the corrosion resistance of resin coatings, including resin coatings reinforced with glass or other filler materials, employed for the protection of corrodible metal structures.

2. Description of the Prior Art

Despite the present advanced state of technology in the plastics industry, and the current widespread availability and use of a variety of resin protective coatings, including resin coatings that are reinforced with glass or other filler materials, the protection of metal bodies against corrosion remains a major industrial problem, and the worldwide expenditure in combating and replacing losses due to corrosion is currently one of the world's greatest economic losses. Many modern resin coatings will intrinsically provide an excellent barrier against various corrosive agents, including such atmospheric corrosive agents as oxygen, water vapor and carbon dioxide, as well as various man-generated atmospheric pollutants, and even against the severe corrosive agents of a marine environment such as those found in salt water. Nevertheless, even the best resin protective coatings, when applied according to current technology to large structures with extensive areas which are likely to be subjected to a severely corrosive environment, such as a marine environment, will not satisfactorily protect such structures from corrosion due to attack by both oxidation and electrolytic action. Examples of such large structures which are not adequately protectable by modern resin coatings applied according to current procedures and which therefore present a continuous problem of deterioration by corrosion when subjected to a highly corrosive environment such as a marine environment, are ship or boat hulls, offshore drilling or production platforms, bridges, pipelines, and the like. Examples of some other metal structures which involve corrosion problems on a very large scale although they are not necessarily subjected to a marine environment, are metal building structural members and panels, cargo shipping containers used on ships, trains, trucks and aircraft, and the bodies or shells of various vehicles such as automobiles, trucks, buses, trains, aircraft and the like.

As an example of the severity of this corrosion problem in a marine environment, the present life expectancy of aluminum ship hulls in salt water is only approximately seven to ten years, even with attempts to protect them from corrosion by the use of the most modern resin coatings.

The conventional procedure for applying a resin protective coating, which may or may not be reinforced with glass or other filler material, onto a metal structure, is to first clean the structure, which may be done by sandblasting, and then to directly apply the resin coating over the cleaned structure. The nature of such resins is that they are characteristically too viscous to substantially penetrate into the pores of the metal surface, and hence are unable to displace moist air or other corrosive agents therefrom. Corrosive agents are therefore inevitably encapsulated in the pores underneath the coating and are free to immediately initiate and perpetuate corrosion from underneath the resin coating. All such entrapped air has a water vapor content, and substantial temperature reductions will cause at least a portion of such water vapor to precipitate as liquid water in the pores. Such moisture, in combination with carbon dioxide and other corrosive agents likely to be present in the air, are free to attack the edges of the interface between the outer surface of the metal and the resin covering at the pores, thereby undermining the bond between the resin covering and the metal surface, and this will occur no matter how well or by what means the outer surface of the metal structure was cleaned. It has historically been a matter of primary concern in the application of resin coatings to metal structures that the structures be entirely free of oil prior to application of the coating.

Such corrosive undermining of conventionally applied resin coatings on metal structures will proceed to occur from the time the coating was applied, at a rate that will depend upon the nature and extent of the corrosive agents captured within the pores, and this will ultimately result in blistering, separation and cracking of the resin coating. The corrosive undermining will be accelerated in areas underneath the resin coating adjacent any regions where the resin has been scratched away to expose bare metal to the environment.

One method that has heretofore been successfully employed to protect resin-coated metal objects from such corrosive undermining has been vacuum impregnation of the pores with resin. However, this method is only applicable to very small metal parts which are capable of being enclosed in a vacuum chamber to which high vacuum may be applied, and the method is not applicable to large metal structures having extended surface areas. Also, this vacuum impregnation method is critical in application, and is slow, time-consuming and expensive.

As indicated above, conventional practice in the application of resin coatings to metal objects requires that the objects be absolutely free of oil, and if it was thought that any oil might be present on the object, such oil was required to be completely removed, generally by chemical means, prior to application of the resin coating. Thus, any suggestion that oil might deliberately be applied to a metal structure as a preparatory step prior to the application of a resin coating would be diametrically opposed to conventional thinking and practice. In fact, the prior art specifically teaches the provision of an oil undercoat for the purpose of preventing a resin outer coating from bonding to metal objects; i.e., the prior art teaches that oil prevents a resin coating from bonding to a metal body. Thus, U.S. Pat. No. 3,084,066 to Dunmire teaches that chain links for marine use be provided with a full oil undercoating beneath a resin covering to prevent adherence of the resin covering to the metal and to provide lubrication for minimizing wear of adjacent links against each other. Retention of the outer resin coating on the objects is only permitted by the specialized nature and small size of the chain links, which enables the outer covering to encapsulate both the oil film and the individual links in a closed loop configuration. Similarly, in U.S. Pat. No. 3,443,982 to Kjellmark, Jr. individual wire strands for an oil well sucker rod each have a full oil-based undercoat with a tubular resin outer jacket that is supported by closed loop encapsulation of the oil around the narrow wire.

An early attempt to utilize oil under an outer coating was disclosed in U.S. Pat. No. 663,281 to Kopp, wherein a metal surface was first completely covered with coal oil, and then immediately an oil base paint was applied over the oil, so that ". . . the oil combines with part of the paint and carries it into the interstices and the paint and oil tend to unite, securing a close adhesion to the surface." This combination of oil and oil based paint had several inherent defects which rendered it generally ineffective for protection against moisture and other corrosive agents. First, since the oil assertedly became combined with the paint, and had to be combined in order to effect any bond of the paint to the metal after the metal surface was "completely and fully" covered with the oil, then the oil simply became a part of the oil base paint. This resulted in a partial thinning of the paint which lessened its effectiveness in bonding and drying, while nevertheless leaving the paint with the inherent defect, now well recognized in the art, that when it did dry, evaporation of solvents therefrom left it porous and pervious to corrosive agents of the atmosphere and marine environments. A further defect of the Kopp oil and paint combination was that upon drying, the paint that had been carried into the interstices or pores suffered the usual shrinkage of drying paint, which caused the paint within the interstices or pores to pull away from the walls, the resulting spaces applying a pressure differential across the porous paint layer to draw air and its corrosive agents into these spaces through the pores in the paint. In this manner, from the time the paint commenced to dry, moisture and other corrosive agents of the atmosphere were drawn into the pores and free to initiate corrosive undermining of the paint covering.

It is notable that all three of the prior art patents referred to above which taught the application of oil prior to an outer coating prescribed that the oil should completely cover the surface of the metal under the outer coating. There was no teaching or suggestion in this prior art that only restricted, selected portions of the metal might be provided with oil under an outer coating, or that there might be any benefit in such an arrangement, or how such might be effected. In particular, the prior art does not teach or suggest that the inner surfaces only of the metal, within the pores, be covered with a first protective or sealing material such as oil which is excluded from the outer surface, and that the outer surface only of the metal be bonded with a second protective or sealing material such as resin in a continuous covering that also bridges over the pores and the said first material. Nor is there any teaching or suggestion in the prior art as to how surface oil might be completely removed from an oil covered and impregnated metal surface so as to admit of an intimate bond with a resin coating, while nevertheless leaving the pores of the metal substantially completely filled with oil.

SUMMARY OF THE INVENTION

In view of these and other problems in the art, it is a general object of the present invention to provide a novel corrosion protection structure which affords greatly increased corrosion protection characteristics to metal bodies as compared to the corrosion protection that is provided by conventional coatings applied according to current technology.

Another object of the present invention is to provide a novel corrosion protection structure which has particular utility in the preservation of large metal structures, which may be composed of steel, aluminum, or any other corrodible metal, that are to be subjected to a severely corrosive environment such as a marine environment, as for example ship or boat hulls, offshore drilling or production platforms, bridges, pipelines or the like; and which also finds particular utility in the protection of various other large metal structures which involve corrosion problems on a very large scale such as metal building structural members and panels, cargo shipping containers used on ships, trains, trucks and aircraft, and the bodies or shells of various vehicles such as automobiles, trucks, buses, trains, aircraft and the like.

Another general object of the present invention is to greatly increase the durability and effectiveness of modern resin coatings against corrosion, particularly in highly corrosive environments such as a salt water marine environment, while nevertheless enabling current technology and production facilities to be utilized for the manufacture of resin polymer coatings such as polyester, epoxy and other resin coatings, which may be reinforced with various filler materials.

A further object of the present invention is to greatly reduce electrolytic activity and other causes of oxidation associated with ship hulls and other structures that are subjected to severely corrosive environments such as a seawater environment. A metal ship hull will function as an anode in seawater, which has high electrolyte content, and current practice is to employ substitute anodes such as zinc anodes at various positions below the waterline. Such substitute anodes reduce but cannot completely eliminate electrolytic deterioration of boat hulls. The present invention has been found to be so highly effective against electrolytic corrosion that such zinc anodes appear completely unused, and are even coated with algae, after some months of testing in seawater in connection with an aluminum boat hull protected by the present invention; whereas similar anodes associated with a conventionally protected aluminum hull would be bright in color and visibly eaten away even after only a few days of seawater use.

A still further object of the invention is to provide a novel structure for protecting metal bodies from corrosion, wherein a resin outer covering is intimately bonded to outer surface means of the metal body in a strong and permanent bond, and wherein the usual problem of corrosive deterioration initiating from pore means of the metal body underneath the outer covering is prevented from occurring by embodying an inner protective or sealing material, preferably oil, within the pore means, the inner protective or sealing material being bridged over and encapsulated in the pore means by the outer resin covering.

Yet another object of the present invention is to provide a novel corrosion protection structure of the character described which will not only protect metal structures from corrosion in unabraded areas for a prolonged operational life, even under highly corrosive conditions, but which will also afford protection adjacent to abraded or scratched regions, preventing corrosion from spreading from such abraded or scratched regions to other areas of the metal surface under the protective structure.

Another object of the invention is to provide a corrosion protection structure of the character described which is inexpensive and easy to apply even to very large metal surface areas, which does not involve use of any environmentally harmful materials, and which is reliable in operation.

In accordance with the present invention, the corrosion protection structure is applied to a metal body having a clean outer surface that is substantially completely free of contaminants, and particularly of oil, and having inner surfaces defining a multiplicity of pores which communicate with said outer surface at respective pore orifices. An inner protective or sealing material, preferably oil, which is generally impervious to corrosive agents of the atmosphere and of marine environments, coats the inner pore surfaces of the metal body and preferably substantially completely fills the pores. An uninterrupted covering of outer protective or sealing material extends over both the outer metal surface and the pores, being intimately bonded to substantially the entire outer metal surface and bridging across the pore orifices so as to encapsulate the said inner protective or sealing material such as oil in the pores. The said outer protective or sealing material is preferably a polymerized resin which is also generally impervious to atmospheric and marine corrosive agents, and which further is generally unmixable with and impervious to the said inner protective or sealing material such as oil so that the outer covering material or its bond to the metal will not be deteriorated by the inner protective material, and so that the inner protective material will be permanently sealed or encapsulated in its operative position in the pores. Preferably, a solid web or plug of the inner protective or sealing material extends across the pores proximate the pore orifices in a direct interfacing relationship with the bridging portions of the outer covering, this web or plug of the inner protective material serving to seal the interface between the outer covering and the outer metal surface in the region of the pore orifices from any corrosive agents that may inadvertently have become entrapped in the pores, as in bubbles, thus assuring the outer covering against corrosive undermining starting from the pores.

BRIEF DESCRIPTION OF THE DRAWINGS

These and other objects of the invention will become more apparent in reference to the following description and the accompanying drawings, wherein.

DETAILED DESCRIPTION

Figure 1:
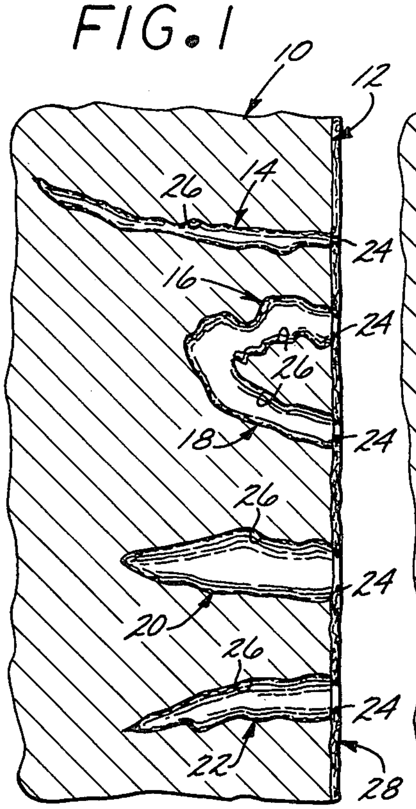
FIG. 1 is a greatly enlarged fragmentary sectional view illustrating a typical microporous metal surface configuration of a metal body to which the present invention is to be applied.

In forming the corrosion protection structure of the present invention, if the pore orifices of the metal body to be protected are initially somewhat constricted from mill rolling or other mill processing, or from contamination such as mill scale or bloom, oxide, old paint or the like, then an initial preparation step is preferably employed to remove such constrictions or obstructions and open out the pore orifices so as to optimize absorption into the pores of the inner protective or sealing material such as oil which is next to be applied. Such initial preparation step, if required, is peferably accomplished by particle-blasting the metal body with particulate material preferably of a type wherein the individual particles have points or corners thereon, such as natural or artificial sand, which opens up and rounds off the pore orifices in a reaming or honing action.

The inner protective or sealing material, preferably oil, is then applied in liquid state over the outer surface and pore orifices of the metal body, and allowed to remain on the metal body for a sufficient interval of time to assure substantially complete impregnation of the pores, the inner protective or sealing material such as oil displacing from the pores substantially all corrosive agents that were previously therein. The inner protective or sealing material such as oil is preferably applied by means of an airless spray gun which provides a mist under pressure that is directed generally normal to the metal surface so as to drive the oil or other inner material into the pores and thereby improve penetration to the bottoms of the pores.

Prior to application of the outer surface treating step described below, the oil or other inner protective or sealing material is preferably driven further into the pores by applying a blast of clean, dry air toward the outer surface and pore orifices of the metal body, this blast of air also serving to remove excess oil or other inner material from the outer metal surface.

After the pores of the metal body have thus been impregnated with the inner protective or sealing material such as oil, an outer surface treating step is applied which comprises selectively removing all of the inner protective or sealing material such as oil that might remain after the impregnation step from the outer surface of the metal body, while at the same time selectively retaining the impregnation of inner protective or sealing material within the pores. This outer surface treating step is preferably accomplished by particle-blasting the outer surface of the metal body with particulate material that is graded so that the individual particles are larger than the pore orifices whereby they will not substantially displace the inner protective or sealing material from the pores; this particle-blasting step preferably being with a material such as natural or artificial sand having individual particles with points or corners that not only thoroughly clean the outer metal surface but also produce a new outer metal surface of irregular, roughened, generally toothed texture which may be considered to be a mechanically etched surface. This particle-blasting step not only prepares the outer metal surface for intimate bonding with the outer covering that is to be applied, but drives the oil or other inner protective or sealing material still further into the pores, and also somewhat dishes out the surfaces of the bodies of oil or other inner protective material in the pores to a gentle, shallow, concave meniscus which has substantial stability against the tendency for oil or other inner protective liquid material to leak or travel out of the pores onto the outer surface, thus providing a desired interval of time after the surface treating step during which the outer covering may be applied without its bonding to the outer surface being adversely affected by the presence of oil or other inner protective material on the outer surface.

The final process step of the invention is application of the uninterrupted covering of outer protective or sealing material, preferably resin which is polymerized in place, the outer covering intimately bonding to the outer metal surface and bridging across the pore orifices so as to encapsulate the bodies of inner protective or sealing material such as oil.

Referring to the drawings, FIG. 1 illustrates a metal body 10 to which the present corrosion protection structure and method are to be applied, but in its conventional form prior to the application of the present invention. Typically, the metal body 10 will be composed of steel or aluminum, although it may be of any other corrodible metal, and generally, but not necessarily, metal body 10 to which the present invention will be applied is part of a large structure having an extensive surface area, and which is to be subjected to a severely corrosive environment such as a marine environment, as for example a ship or boat hull, an offshore drilling or production platform, a bridge, a pipeline, or the like. Examples of some other metal structures which involve corrosion problems on a very large scale and which are therefore desirable subjects for application of the present invention are metal building structural members and panels, cargo shipping containers used on ships, trains, trucks and aircraft, and the bodies or shells of various vehicles such as automobiles, trucks, buses, trains, aircraft and the like.

The greatly enlarged illustration of FIG. 1 shows a typical microporous metal surface configuration to which the present invention will be applied, the metal body 10 having a generally flat outer surface 12 that is interrupted by a multiplicity of minute, generally microscopic pores such as the pores 14, 16, 18, 20, and 22 that are illustrated. As used herein, the term "pores" refers to the minute openings, interstices or other irregularities in which liquid may be absorbed that are characteristically found in the surfaces of metal bodies. Each of the pores 14, 16, 18, 20, and 22 has an orifice 24 where it opens at the outer surface 12 of metal body 10. The pores 14, 16, 18, 20 and 22 are defined by inner pore surfaces 26 which may have small quantities of oxide or other contaminants thereon that are encapsulated and rendered generally ineffective as corrosive agents by the present invention.

Figure 3:
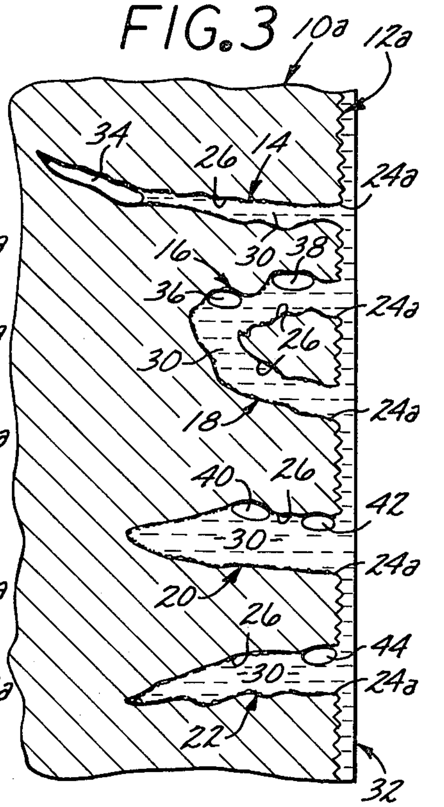
FIG. 3 is a view similar to FIGS. 1 and 2 showing the metal body after inner protective or sealing material such as oil has been applied thereto and allowed to impregnate the pores.

As indicated in FIG. 1, the pore orficies 24 may initially be somewhat constricted from mill rolling or other mill processing, and even new metal as received directly from the mill may have significant amounts of surface contamination 28 such as mill scale or bloom, or oxide. Surface contamination 28 of a metal body 10 to which the present invention is to be applied may also include old paint or other partly deteriorated covering material. As seen in FIG. 1, such surface contamination 28 may further restrict the pore orifices 24, and in some instances may even completely close off pore orifices. Any such constrictions of the pore orifices resulting from mill processing, surface contamination, or other cause, will tend to obstruct the free flow of inner protective or sealing material such as oil into the pores during the method step of the invention that is illustrated in FIG. 3. Accordingly, if any substantial such constriction or obstruction of the pore orifices 24 exists in the initial condition of the metal body 10, then an initial preparation step is preferably employed in the method or process phase of the invention to remove such constrictions or obstructions and open out the pore orifices so as to optimize absorption into the pores of the inner protective or sealing material such as oil which is applied in the method or process step shown in FIG. 3.

The presently preferred method for opening up constricted or obstructed pore orifices 24 is to particle-blast the metal body 10 with particulate material preferably of a type wherein the individual particles have a plurality of points or corners, such as natural or artificial sand. Blasting with No. 3 size sand particles or equivalent artificial sand particles has been found to satisfactorily remove scale and oxide obstructions from the pore orifices, as well as to open up pore orifice constrictions and make the edges of the pore orifices generally rounded, so as to expose the pores for rapid and substantially complete absorption therein of the inner protective or sealing material such as oil. It can be determined that the particle-blasting has been applied to a sufficient extent to properly clear and open the pore orifices when the outer surface of the metal body 10 has been cleaned by the particle-blasting to a bright, generally white appearance. This initial particle-blasting step serves the further function of blowing moisture and other corrosive agents out of the opened pores, facilitating displacement of any remaining corrosive agents by the oil or other inner protective or sealing material that is about to be applied. In order to minimize moisture in the pores after this initial particle-blasting step, the step is preferably performed in dry weather and during the daytime, when the humidity is relatively low.

The satisfactory use of No. 3 size particles referred to above was in the initial preparation of steel and aluminum sheet materials of types employed in boat hulls. The No. 3 size particles properly cleared and opened up the pore orifices without undesirable pitting of the metal surfaces. It is to be understood that finer particulate matter may be used for the particle-blasting of softer metals; while larger particulate matter may be employed provided the metals are sufficiently hard to avoid undesirable pitting.

Figure 2:
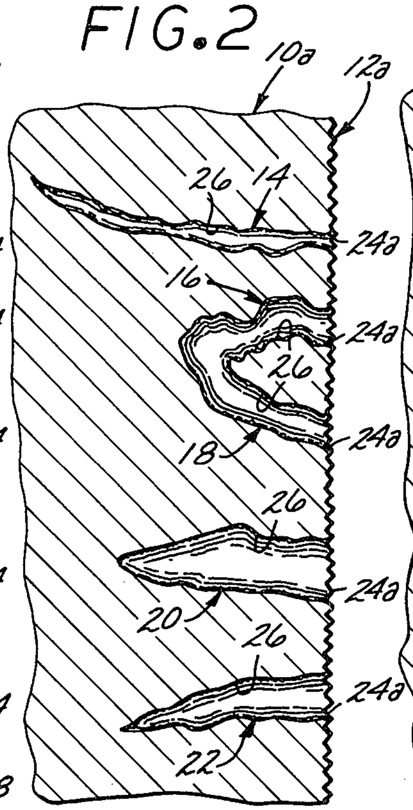
FIG. 2 is a view similar to FIG. 1 showing the metal body after an initial preparation step, preferably particle-blasting, has been applied to open out the pore orifices and remove surface contamination.

FIG. 2 illustrates the general condition of the metal body 10 after the application of the initial preparation step of particle-blasting, the metal body now being designated **10*a*. All of the external surface contamination layer 28 has been removed from the outer surface 12 of metal body 10, and the prepared metal body 10*a* now has a new outer surface 12*a* which is clean and as a result of impingement of the points or corners of the blasted particles has a roughened, toothed texture that is bright and generally white in appearance. The pore orifices 24*a* have been cleared of scale, oxide, paint or other contaminants, and constrictions or sharp corners from mill operations have been opened and rounded off by a reaming or honing action of the points or corners of the particles employed in the particle-blasting. The opened, rounded pore orifices 24*a* so readily conduct liquid into the pores that when oil is applied to the initially prepared metal body 10*a* as the inner protective or sealing material of the present invention, the metal body 10*a* appears to soak up the oil much like a sponge. A further important feature of the open pore orifices 24*a* is that during the application of the inner protective or sealing material such as oil as illustrated in FIG. 3, and particularly when later the oil is removed from the surface of the metal body and the surface is prepared to receive the outer protective or sealing material, which is the condition of the metal body illustrated in FIG. 4**, any air bubbles that may be present in the oil-filled pores proximate the orifices will not tend to remain entrapped proximate the pore orifices, but will be readily displaced by the oil and thereby ejected out of the open orifices.

FIG. 3 illustrates the initially prepared metal body **10*a*** after application of the inner protective or sealing material. The inner protective or sealing material such as oil is applied as soon as is practical after the aforesaid initial particle-blasting step, and preferably before any substantial increase in ambient humidity might tend to introduce moisture into the pores. Should moisture inadvertently get into the pores of the metal after the initial particle-blasting step but before the application of the inner protective or sealing material such as oil, as for example from rain or condensation from being left overnight, then it is desirable to perform the initial particle-blasting step again, or to at least apply an initial blast of clean, dry air, so as to drive such moisture out of the pores before proceeding with the application of the inner protective or sealing material such as oil.

The inner protective or sealing material is applied in liquid state and is selected to have a sufficiently low viscosity at the time of application to the metal body **10*a* that it will readily wet the inner pore surfaces 26 and impregnate the pores, preferably to the extent that the pores are substantially filled with the inner protective or sealing material. Despite the objective of substantially completely filling the pores with the inner protective or sealing material, it is understood that some atmospheric bubbles may nevertheless inadvertently become entrapped within some of the pores, depending upon the configurations and orientations of the individual pores. Thus, for illustrative purposes, in FIG. 3 it has been assumed that a bubble 34 has been entrapped in the very thin, deep root portion of the long, thin pore 14; a pair of bubbles 36 and 38 have been entrapped behind overhangs within the upper of the two pores 16 and 18 which communicate at their roots; a bubble 40 has been entrapped deeply within pore 20, and bubbles 42 and 44 have been captured near the orifices 24 of respective pores 20 and 22**.

As seen in FIG. 3, the inner protective or sealing material is applied over the entire surface region of the metal body **10*a*, including both the outer surface 12*a* and the pore orifices 24*a*, so as to assure maximum penetration of the inner protective or sealing material into the pores. This application is preferably by means of an airless spray gun which provides a mist under pressure that is directed generally normal to the metal surface so as to drive the inner protective or sealing material into the pores, improving penetration to the bottoms of the pores. This will result in the pores 14, 16, 18, 20 and 22 each being substantially completely filled with bodies 30 of the inner protective or sealing material, with an outer film 32 of the inner protective or sealing material extending over both the outer surface 12*a* of metal body 10*a* and over the pore orifices 24*a*. This excess of the inner protective or sealing material when it is applied assures an adequate supply of the inner protective or sealing material during the interval of time that it is allowed to remain on the metal body 10*a* as in FIG. 3 for maximum penetration of the inner protective or sealing material into the pores. When the inner protective or sealing material thus impregnates the pores, it displaces from the pores substantially all corrosive agents that were previously in the pores, including such atmospheric corrosive agents as oxygen, water vapor and carbon dioxide, as well as various man-generated atmospheric pollutants; and if the metal body 10*a* is proximate a marine environment, such marine corrosive agents as water, and particularly sea water with its considerable electrolyte content. Any such corrosive agents that may inadvertently still remain in the pores will be isolated in bubbles, and any such bubbles will be insulated from the inner pore surfaces 26*a* by a film of the inner protective or sealing material which capillary action will cause to wet substantially the entire inner pore surfaces 26** even in the regions of any such bubbles.

Prior to application of the outer surface treating step described below, the inner protective or sealing material such as oil is preferably driven further into the pores by application of a blast of clean dry air against the outer film 32 of inner material, i.e., toward the outer metal surface **12*a* and pore orifices 24*a*. This blast of air also serves to remove excess inner material such as oil from the outer metal surface 12*a***.

Figure 4:
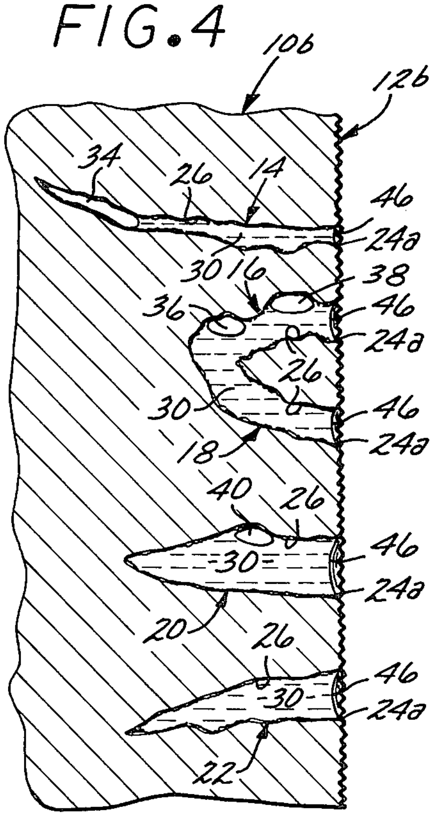
FIG. 4 is a view similar to FIGS. 1-3, showing the metal body after an outer surface treating step, preferably particle-blasting, has been applied to selectively remove oil or other inner protective material that might remain on the outer surface after impregnation of the pores, while at the same time selectively retaining the impregnation of the oil or other protective material in the pores and providing a stable concave configuration to the surfaces of the bodies of impregnated material.

The presently preferred inner protective or sealing material is oil which is selected according to the composition of the metal body **10*a* so that it is thin enough, i.e., of low enough viscosity, to substantially completely impregnate the pores within a reasonable time, e.g., within a period of time ranging from a few seconds to a few hours, and yet have sufficient viscosity so that it will not readily travel or leak out of the pores after the outer film 32 of oil has been removed from the outer surface of the metal body as illustrated in FIG. 4. Thus, the oil must have sufficient viscosity so that after the treating step which produces the clean outer surface of the metal body as shown in FIG. 4, the oil will remain within the pores and not travel or leak out onto the outer surface of the metal body for a period of time sufficient to allow application of the covering of outer protective or sealing material which is shown applied in FIG. 5**.

Figure 5:
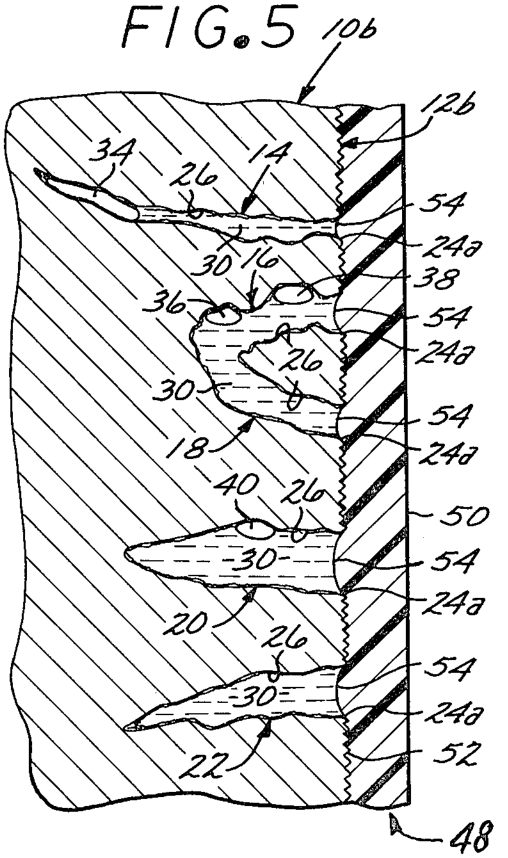
FIG. 5 is a view similar to FIGS. 1-4 illustrating the completed protected metal body after application of the covering of outer protective or sealing material, preferably resin with or without filler.

In accordance with the preferred embodiment of the present invention, when the metal being treated is steel the oil utilized as the inner protective or sealing material can advantageously be a 30 weight motor oil. When the metal being treated is aluminum, which has smaller pores than steel, a less viscous oil, e.g., "3-In-1" brand oil, can be used advantageously as the inner protective or sealing material, the molecules of "3-In-1" oil being considerably smaller than those of 30 weight oil. In both of these examples excellent impregnation of the metal pores will occur within only a few minutes, as for example within about five minutes, although to assure optimum impregnation the oil may be left standing on the metal surface for as long a twelve hours or even longer if convenient. In both of these examples, after the treating step has been applied to remove the outer film 32 of oil and expose the bare metal surface as shown in FIG. 4, it has been found that it is preferable to apply the covering of outer protective or sealing material as shown in FIG. 5 within about four hours after the treating step has been employed to expose the outer metal surface as in FIG. 4, and that best results are obtained if the covering of outer protective or sealing material is applied within about 2 hours after the treating step has been employed to expose the bare metal surface as in FIG. 4.

It is advantageous in some applications to heat the oil prior to application to facilitate its movement into the pores. Once the oil cools within the pores to the ambient temperature, it will thicken and, therefore, tend to remain in the pores.

Once the oil or other inner protective or sealing material is thus impregnated into the pores, it is held therein by combined forces of atmospheric pressure and capillary attraction. These holding forces are so strong relative to the force of gravity on the very minute bodies 30 of inner material in the pores that the rate at which the inner material tends to come out of the pores appears to be the same regardless of the orientation of the metal surface being treated, as for example regardless of whether the surface is facing up or down.

After the pores of the metal body 10*a* have thus been impregnated with the inner protective or sealing material such as oil, a treating step is then applied to the metal body 10*a* to prepare the metal body for receiving the covering of outer protective or sealing material. This treating step will be described in connection with FIG. 4, and will sometimes hereinafter be referred to as an outer surface treating step as distinguished from the pore-treating steps heretofore described which included the initial preparation step of clearing the pore orifices described in connection with FIG. 2 and the impregnation step described in connection with FIG. 3. This outer surface treating step comprises selectively removing all of the inner protective or sealing material such as oil that might remain after the impregnation step from the outer surface 12*a* of metal body 10*a*, while at the same time selectively retaining the impregnation of inner protective or sealing material such as oil within the pores. The outer surface treating step preferably includes the production of a new outer surface 12*b* on the metal body 10*b* as shown in FIG. 4, which replaces the previous outer surface 12*a* on the metal body 10*a* of FIG. 3. Such provision of a new outer surface 12*b* assures the complete elimination of inner protective or sealing material such as oil from the outer surface of the metal body, which is a critical factor in obtaining a full and complete intimate bond of the outer covering material with the entire outer surface 12*b*.

The presently preferred technique for applying this outer surface treating step is to particle-blast the outer surface of the metal body with particulate material that is graded so that the individual particles are larger than the orifices of the pores whereby the particles will not enter the pores and displace the oil therefrom to any material extent, but will impinge upon and remove the oil from the entire exposed outer surface of the metal body. Preferably, the particulate material employed in the particle-blasting is a material such as natural or artificial sand wherein the individual particles have points or corners so that the outer surface of the metal body will not only be thoroughly cleaned, but it will constitute a new surface of irregular, roughened, generally toothed texture that provides an enlarged area for intimate bonding of the outer covering material, i.e., a greater bonding area than the area defined by the general plane of the outer surface. A No. 3 natural or artificial sand has been found to operate satisfactorily in the outer surface treating step as applied to steel and aluminum, although it is to be understood that other grades or sizes of particles may be employed, provided the particles are not so small as to materially enter the pores and thereby displace material amounts of the inner protective or sealing material such as oil from the pores, and provided the particles are not so large as to cause excessive pitting of the outer surface of the metal body.

Any fine particulate material that may inadvertently enter and remain in the pores from either or both of the particle-blasting steps will become encapsulated in the bodies 30 of oil or other inner protective or sealing material, and any such entrapped fine particles of sand are composed of silica, an inert material. Accordingly, the presence of any such fine particulate material in the pores will not tend to diminish the corrosion resistance characteristics of the completed product of the present invention.

The new outer surface 12*b* of metal body 10*b* may be described as a mechanically etched surface. When this outer surface 12*b* has been treated to a required extent to assure that good intimate bonding of the outer covering layer will be achieved, the outer surface 12*b* will be bright and generally white in appearance.

Particle blasting in the outer surface treating step involves a mechanical treatment that is applied in directions generally normal to the general plane of the surface of the metal body, and this avoids any likelihood of the inner protective or sealing material such as oil being wiped laterally out of the pores back onto the outer surface during the treatment. Slight entry of points of the particles into the pore orifices drives the inner protective or sealing material such as oil still further into the pores, and results in surfaces 46 of the bodies 30 of inner protective or sealing material such as oil which are in the form of a gentle, shallow, concave meniscus extending uninterrupted across the pore orifices and retained in this configuration by an approximate balance between the metal-to-sealing material interface surface tension at the peripheries of surfaces 46 and the sealing material-to-air interface surface tension across the surfaces 46. The aforesaid factors tending to hold the bodies 30 of inner sealing material in place in the pores, together with this concave or inward configuration of the surfaces 46 of bodies 30, and the inherent stability of the meniscuses of such configuration, minimize and retard the tendency for the inner sealing material to leak or travel out of the pores onto the clean new outer surface 12*b*, thereby providing adequate time, as for example from about two to about four hours, after the outer surface treating step during which the outer protective covering may be applied with assurance that there will be full intimate bonding thereof with the entire area of the outer surface 12*b* of metal body 10*b*. The concave curvature of surfaces 46 is also sufficiently shallow to permit full surface interfacing thereof with the more viscous outer covering material when the latter is applied as illustrated in FIG. 5.

An indicator that too much time has lapsed since the outer treating step so that the inner protective or sealing material such as oil has started to leak or travel out of the pores onto the outer surface 12*b* is that the surface 12*b* commences to darken from its previous bright, white appearance. If such occurs, or if the inner material such as oil is left too long before the outer surface treatment is applied and this causes inner material to leak out of the pores, then in either event the inner material such as oil should be re-applied, and the outer surface treatment applied (again if it had already been applied).

During the outer surface treating step, impingement of some of the particles proximate the pore orifices tends to agitate outer regions of the bodies 30 of inner protective or sealing material such as oil in a manner which will cause the release of any atmospheric bubbles that may have become entrapped near the pore orifices, as for example the bubbles 42 and 44 seen in the respective pores 20 and 22 in FIG. 3, whereby a solid web or plug of the inner protective or sealing material extends across the pores proximate the orifices as seen in FIG. 4. This solid web or plug of the inner sealing material will not only cooperate with the outer layer of sealing material to protect the latter against corrosive undermining in the completed product, but also provides an effective barrier against entry of any corrosive agents into the pores during the interval of time between application of the outer surface teating step illustrated in FIG. 4 and application of the covering of outer protective or sealing material as illustrated in FIG. 5.

Referring now to FIG. 5, the final process step in the present invention is application of an uninterrupted covering 48 of outer protective or sealing material which directly interfaces with both the outer metal body surface 12*b* and the surfaces 46 of the bodies 30 of inner protective or sealing material such as oil, but which adheres and bonds only to the outer metal surface 12*b* when a liquid inner protective material such as oil is employed, the covering 48 being wetted by, but not bonded or adhered to, the liquid inner protective or sealing material at the surfaces 46 thereof. The covering 48 of outer protective or sealing material is applied before any material extent of travel or leakage of the inner protective or sealing material such as oil can occur out of the pores onto the outer surface 12*b*, i.e., before the surface 12*b* visibly changes color, darkening from its bright, generally white appearance, for two reasons: (1) so that the outer metal surface 12*b* remains free of the inner protective or sealing material such as oil as a contaminant thereon; and (2) so that the surfaces 46 of inner protective or sealing material such as oil do not recede to a lowered level in the pores which might interfere with the desired direct interfacing between the covering 48 and the bodies 30 in the pores.

The covering of outer protective or sealing material preferably has a generally smooth outer surface 50. The covering 48 has a direct interface 52 with the entire outer surface 12*b* in the form of an intimate bond therebetween, and the covering 48 bridges over and encapsulates the bodies 30 of inner protective or sealing material such as oil, having direct interfaces 54 with such bodies 30 of inner protective or sealing material.

If the inner protective or sealing material employed has the characteristic which oil has of remaining in liquid form after impregnating the pores, then it is preferred that the material of the outer covering 48 have the characteristic of not being materially combinable or miscible with the liquid inner material such as oil, so that the liquid inner material does not tend to be absorbed out of the pores into the outer covering material, and so that the outer covering material does not tend to become diluted by the liquid inner material and thereby rendered less effective as an outer protective covering. The material of outer covering 48 is also selected so that the covering 48 is generally impervious to, or impermeable by, a liquid inner protective material such as oil, so that the oil will not be dissipated through the covering 48 and the bodies 30 thereof will remain generally full and intact over an extended operational life of the completed product as illustrated in FIG. 5.

The covering 48 of outer protective or sealing material and the inner protective or sealing material such as oil are both selected to be generally impervious to or impermeable by corrosive agents of the atmosphere and of marine environments. Thus, the covering 48 of outer protective or sealing material protects its interface 52 with outer metal surface 12*b* against attack from outside atmospheric or marine corrosive agents. Outer covering 48 also protects its interfaces 54 with bodies 30 of inner protective material against attack from outside atmospheric or marine corrosive agents, and hence bars outside corrosive agents from entering into a location between covering 48 and bodies 30 where they could attack the edges of the interface 52 in the regions of the pore orifices. The inner protective or sealing material, also being generally impervious to or impermeable by corrosive agents, seals the interface 52 between outer covering 48 and outer metal surface 12*b* in the region of the pore orifices from any corrosive agents that may inadvertently have become entrapped, as in bubbles, in the pores during the process steps, thus assuring the outer covering 48 against corrosive undermining starting from the pores.

The outer protective or sealing material employed to form the uninterrupted covering 48 shown in FIG. 5, in order to have the required characteristics of being capable of forming an intimate bond to the outer metal surface 12*b*, being impervious to or impenetrable by atmospheric or marine corrosive agents, not being materially combinable or miscible with the inner protective sealing material and also being impervious to or impenetrable by the inner protective or sealing material, is preferably a resin polymer, i.e., a polymerized resin, chosen from many of the commercially available resin and reinforced resin coatings, reinforced with glass or other of the various available filler materials. Some suitable polymerized resins, which are given by way of example only, and not of limitation, include polyester resin, which is currently widely used in boat hulls and protective coatings for marine and other uses, epoxy, polystyrene, polyethylene, polypropylene, polyvinyl chloride, and polyimide.

The outer protective or sealing resin material for covering 48 is preferably a resin which will harden after application without material change in dimension; i.e., without material contraction or expansion. This characteristic is achievable with such a resin covering 48 since the resin solidifies and hardens through polymerization rather than evaporation as with paints. By not materially changing in dimension upon hardening, and in particular by not materially contracting, the resin covering 48 will not as it sets up disadvantageously disturb the dispositions of bodies 30 of inner protective or sealing material in the pores or the interfaces 54 between covering 48 and the bodies 30; and will not tend to break the establishing intimate bond with the outer metal surface 12*b* as it hardens, or tend to crack and thereby diminish its impermeability to corrosive agents or to the inner protective or sealing material.

In accordance with the present invention, it is preferred that the inner protective or sealing material have the physical characteristic, like oil, or remaining in liquid form after being encapsulated under the outer covering 48. With the inner protective or sealing material remaining in liquid state, thermal expansion and contraction of the metal body 10*b*, of the outer covering 48, or of the bodies 30 of inner protective or sealing material, or relative thermal expansion and contraction between any or all of these, will not tend to cause any separation of the inner protective or sealing material either from the inner pore surfaces 26 or, more importantly, from the interface between the outer covering layer 48 and the outer metal surface 12*b* proximate the pore orifices.

It will be seen from the foregoing, and from the illustration of FIG. 5, that in accordance with the present invention assurance is achieved against corrosion which might otherwise initiate either from underneath the outer covering 48 or from the outside of covering 48, by coating of substantially the entire surface area of the metal body, including both the inner pore surface area which is the summation of the inner pore surfaces 26, and the area of the outer surface 12*b*. Thus, the inner surface area is covered by the inner protective or sealing material, and where such material leaves off, the outer protective or sealing material of the covering 48 commences, these two materials interfacing at the interfaces 54 proximate the pore orifices.

EXAMPLE I

A sample of No. 5153 aluminum was sandblasted with No. 3 sand to bare metal. A coating of "3-In-1" brand oil was applied to the aluminum by use of an airless spray gun to provide a mist under pressure. The oil mist was left on the aluminum for approximately 12 hours, and then most of the oil on the outer surface was removed by a blast of clean, dry air. The outer surface was then treated by sandblasting with No. 3 sand until the outer surface had a bright, white appearance, thus preparing the outer surface of the aluminum to receive the outer covering of protective or sealing material, while retaining oil in the pores. Shortly thereafter a protective coating of "Res-N-Glas" brand glass reinforced resin manufactured by Woolsey Marine Industries, Inc., of Danbury, Conn. 06810, was applied in an uninterrupted covering over the treated aluminum surface, intimately bonding to the treated outer aluminum surface and bridging across the pore orifices and encapsulating the oil retained within the pores. The coating bond to the aluminum was excellent and subsequent tests proved that the completed article had excellent corrosion preventive characteristics.

EXAMPLE II

Two steel spars on a vessel were treated for corrosion prevention and then subjected to salt water environment for approximately one year. The first spar was treated in accordance with the present invention by a process including the following steps: (a) the spar was sandblasted with No. 3 sand; (b) the spar was completely coated with 30 weight motor oil; (c) the oil-coated spar was treated by sandblasting with No. 3 sand to provide an outer surface substantially free of oil while retaining oil within the pores; (d) a resin coating was applied to the spar; and (e) paint was applied over the resin.

The second spar was treated according to the following process: (a) the spar was sandblasted with No. 3 sand; (b) a resin coating was applied; and (c) paint was applied over the resin.

The first spar has displayed corrosion only in areas where the resin had been scratched away to expose bare metal to the environment. After continued exposure, the scratched area was found to rust, but the rust did not spread under the adjacent resin coating to other areas of the metal surface.

The second spar has blistered and corroded in numerous places. Not only has the exposed metal at a scratched area rusted, but the rust has also spread from that area to areas underneath the adjoining coating.

The process of the present invention has been disclosed in connection with the use of certain inner protective or sealing materials, i.e., "3-In-1" brand oil and 30 weight motor oil, and the use of certain metals, i.e., aluminum and steel. It will be evident from the above discussion, however, that the process of the present invention is not dependent upon the use of such specific materials, except that the features and advantages of the present invention are best achieved through the matching of the characteristics of the inner protective or sealing material such as oil and the metal. Furthermore, it will be apparent that the present invention is not limited to the particular outer protective or covering materials discussed above and that any suitable covering 48 of outer protective or sealing material may be utilized provided that it is impenetrable or impermeable by external corrosive agents and also by the inner protective or sealing material, and is not materially combinable or miscible with the inner protective or sealing material, and provided further that the outer protective or sealing material exhibits satisfactory intimate bonding characteristics with the prepared outer metal surface. Accordingly, the process of the present invention must be broadly construed and the selection of particular inner and outer protective or sealing materials can be easily carried out and parameters determined by those skilled in the art.

Accordingly, the present invention is not limited by the specific exemplifications above, but must be construed as broadly as any and all equivalents thereof.

I claim:

1. Corrosion protection structure for a metal body having outer surface means and pore means communicating with said outer surface means, which comprises:
   - inner protective material that is substantially impervious to atmospheric corrosive agents disposed within said pore means, said outer surface means being substantially free of said inner material, and
   - outer protective material which is different from said inner material and is in solid state that is substantially impervious to atmospheric corrosive agents and to said inner material forming a covering over said outer surface means and said pore means, said covering being intimately bonded to said outer surface means and bridging over said pore means.

2. Corrosion protection structure as defined in claim 1, wherein said inner material is not substantially combined with said outer material.

3. Corrosion protection structure as defined in claim 1, wherein said inner material is in liquid state.

4. Corrosion protection structure as defined in claim 1, wherein the bonded interface between said covering and said outer surface means at said pores is sealed by said inner material against penetration by atmospheric corrosive agents that may be entrapped in said pores.

5. Corrosion protection structure as defined in claim 1, wherein said inner material substantially covers the inner surface means of said metal body that is defined by said pore means.

6. Corrosion protection structure as defined in claim 1, wherein web means of said inner material extends across said pore means proximate the region where said pore means communicates with said outer surface means.

7. Corrosion protection structure as defined in claim 6, wherein said web means has concave outwardly facing surface means.

8. Corrosion protection structure as defined in claim 6, wherein said web means has outwardly facing surface means which directly interfaces with said covering in the region where said covering bridges over said pore means.

9. Corrosion protection structure as defined in claim 1, wherein said pore means is substantially filled with said inner material.

10. Corrosion protection structure as defined in claim 9, wherein atmospheric bubbles that may be entrapped in said pore means are encapsulated in said inner material.

11. Corrosion protection structure as defined in claim 1, wherein said inner material comprises oil.

12. Corrosion protection structure as defined in claim 1, wherein said outer material is substantially impervious to marine corrosive agents.

13. Corrosion protection structure as defined in claim 1, wherein said metal body comprises steel.

14. Corrosion protection structure as defined in claim 1, wherein said metal body comprises aluminum.

15. Corrosion protection structure as defined in claim 1, wherein said outer surface means has a roughened texture.

16. Corrosion protection structure as defined in claim 1, wherein said outer surface means has a mechanically etched texture.

17. Corrosion protection structure as defined in claim 1, wherein said outer surface means has a generally toothed texture.

18. Corrosion protection structure as defined in claim 1, wherein the edges of the openings of said pore means are generally rounded.

19. Corrosion protection structure as defined in claim 1, wherein said outer material comprises resin.

20. Corrosion protection structure as defined in claim 19, wherein said resin is reinforced with filler material.

21. Corrosion protection structure as defined in claim 19, wherein said inner material comprises oil.

* * * * *